United States Patent
Lagerqvist et al.

(10) Patent No.: US 11,223,410 B2
(45) Date of Patent: Jan. 11, 2022

(54) OBSCURATION OF THE EXPECTED BEAM IN A WIRELESS COMMUNICATION

(71) Applicant: TELEFONAKTIEBOLAGET LM ERICSSON (PUBL), Stockholm (SE)

(72) Inventors: Tomas Lagerqvist, Stockholm (SE); Magnus Finne, Sundbyberg (SE); Mikael Jonsson, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 133 days.

(21) Appl. No.: 16/623,063

(22) PCT Filed: Jun. 20, 2017

(86) PCT No.: PCT/SE2017/050676
§ 371 (c)(1),
(2) Date: Dec. 16, 2019

(87) PCT Pub. No.: WO2018/236257
PCT Pub. Date: Dec. 27, 2018

(65) Prior Publication Data
US 2021/0091842 A1 Mar. 25, 2021

(51) Int. Cl.
*H04B 7/06* (2006.01)
*G06N 20/00* (2019.01)
(Continued)

(52) U.S. Cl.
CPC .......... *H04B 7/0695* (2013.01); *G06N 20/00* (2019.01); *H04B 7/0408* (2013.01); *H04B 7/0617* (2013.01); *H04W 16/28* (2013.01)

(58) Field of Classification Search
CPC .. H04B 7/0695; H04B 7/0408; H04B 7/0617; G06N 20/00; H04W 16/28
See application file for complete search history.

(56) References Cited

U.S. PATENT DOCUMENTS

2007/0249402 A1* 10/2007 Dong .................... H04W 16/28
455/562.1
2014/0323143 A1  10/2014 Jung et al.
(Continued)

FOREIGN PATENT DOCUMENTS

WO  2016165128 A1  10/2016

OTHER PUBLICATIONS

International Search Report in related/corresponding PCT Application No. PCT/SE2017/050676 dated Feb. 28, 2018.
(Continued)

*Primary Examiner* — Steven H Nguyen
(74) *Attorney, Agent, or Firm* — Patent Portfolio Builders PLLC

(57) ABSTRACT

A network node is operable in a wireless communication network, and a wireless device (201) being associated with a serving beam (#4) managed by a radio network node associated with the network node. The method comprises obtaining (120) a position of the wireless device, wherein the position of the wireless device is associated with an expected beam. When the serving beam and the expected beam are different from each other thereby resulting in a deviation, the method comprises determining (140) whether the deviation has occurred at least more than once. When the deviation has occurred at least more than once, the method comprises issuing (160) a notification indicating that the expected beam is at least partially obscured with respect to transmissions for the wireless device.

16 Claims, 7 Drawing Sheets

(51) Int. Cl.
H04B 7/0408 (2017.01)
H04W 16/28 (2009.01)

(56) References Cited

U.S. PATENT DOCUMENTS

| | | | | |
|---|---|---|---|---|
| 2015/0092744 | A1* | 4/2015 | Singh | H04L 47/29 |
| | | | | 370/331 |
| 2016/0007261 | A1* | 1/2016 | Oh | H04B 7/088 |
| | | | | 455/438 |
| 2016/0329636 | A1 | 11/2016 | Larsson et al. | |
| 2019/0097712 | A1* | 3/2019 | Singh | H04B 7/04 |

OTHER PUBLICATIONS

Written Opinion of the International Searching Authority in related/corresponding PCT Application No. PCT/SE2017/050676 dated Feb. 28, 2018.
Alkhateeb A., et al.; "Initial Beam Association in Millimeter Wave Cellular Systems: Analysis and Design Insights"; arxiv. org. Cornell University Library, 201 Olin Library Cornell University; XP080685038; Feb. 22, 2016; 30 pages; Ithaca, NY.
Office Action in corresponding/related European Application No. 17 733 557.7 dated Nov. 12, 2020.

* cited by examiner

OBSCURATION OF THE EXPECTED BEAM IN A WIRELESS COMMUNICATION

TECHNICAL FIELD

The present disclosure relates to wireless communication and in particular to a network node and a method performed by a network node communicating with a wireless device.

BACKGROUND

To support increased traffic volumes and to enable the transmission bandwidths needed to support very high data rates, $5^{th}$ Generation, 5G, wireless communication networks/systems or New Radio, NR, will extend the range of frequencies used for mobile communication. This includes new spectrum in frequency bands with millimetre waves, MMW.

The MMW spectrum is due to propagation characteristics intended to serve as a complement to lower frequency bands. The MMW spectrum will mainly provide additional system capacity and very wide transmission bandwidths for extreme data rates in dense deployments. Spectrum allocations at lower bands will probably remain the backbone for mobile-communication networks in the 5G era providing wide-area connectivity.

Due to the propagation characteristics in the MMW spectrum beamforming is used to improve coverage by combining several antennas to maximize the transmitted energy in the desired direction. Due to the shape of the beams the interference is limited to a smaller geographical area. Beamforming may also be used in the non-MMW spectrum for example for increasing capacity.

With the beams being relatively narrow, the transmitted energy of a signal may be, or is, directed towards a wireless device thereby increasing the signal quality between the network node and the wireless device and causing minimal interference to transmissions between the network node and other wireless devices at other positions. Especially, but not only, MMW transmissions works best at line-of-sight. The waves are much more blocked by obstacles such as buildings and attenuated by foliage in the MMW range than at lower frequencies.

The obstacles might also change over time, e.g. parked vehicles or new buildings being build. Due to this there might be spots where wireless devices cannot be reached and therefore the network will not reach its full potential.

SUMMARY

The object is to obviate at least some of the problems outlined above. In particular, it is an object to provide a network node and a method performed thereby for communicating with a wireless device. These objects and others may be obtained by providing a network node and a method in a network node according to the independent claims attached below.

According to an aspect, a method performed by a network node for communicating with a wireless device is provided. The network node is operable in a wireless communication network, and the wireless device being associated with a serving beam managed by a radio network node associated with the network node. The method comprises obtaining a position of the wireless device, wherein the position of the wireless device is associated with an expected beam. When the serving beam and the expected beam are different from each other thereby resulting in a deviation, the method comprises determining whether the deviation has occurred at least more than once. When the deviation has occurred at least more than once, the method comprises issuing a notification indicating that the expected beam is at least partially obscured with respect to transmissions for the wireless device.

According to an aspect, a network node for communicating with a wireless device is provided. The network node is operable in a wireless communication network, and the wireless device being associated with a serving beam managed by a radio network node associated with the network node. The network node is configured for obtaining a position of the wireless device, wherein the position of the wireless device is associated with an expected beam. When the serving beam and the expected beam are different from each other thereby resulting in a deviation, the network node is configured for determining whether the deviation has occurred at least more than once. When the deviation has occurred at least more than once, the network node is configured for issuing a notification indicating that the expected beam is at least partially obscured with respect to transmissions for the wireless device.

The network node and the method performed by the network node has several advantages. One possible advantage is that beams and/or cells where obstacles influence performance may be identified. Another possible advantage is that e.g. an operator may be provided with information to be used during network optimisation. Yet another possible advantage is that collected information may be used as input to automated coverage optimisation functionality.

BRIEF DESCRIPTION OF DRAWINGS

Embodiments will now be described in more detail in relation to the accompanying drawings, in which.

DETAILED DESCRIPTION

Briefly described, a network node and a method performed thereby for communicating with a wireless device are provided. In order to take measures to overcome the unwanted effects from blocking obstacles in a radio network of a wireless communication network, the beams suffering from getting signals obscured or blocked are identified. Once a network node of the radio network of the wireless communication network determines that a beam associated with a position of a coverage area or cell of the network node is at least partially obscured, the network node may issue a notification in order to draw attention to the fact that there may be an obstacle present in the coverage area. The obstacle causes the beam to be at least partially obscured.

Figure 1A:
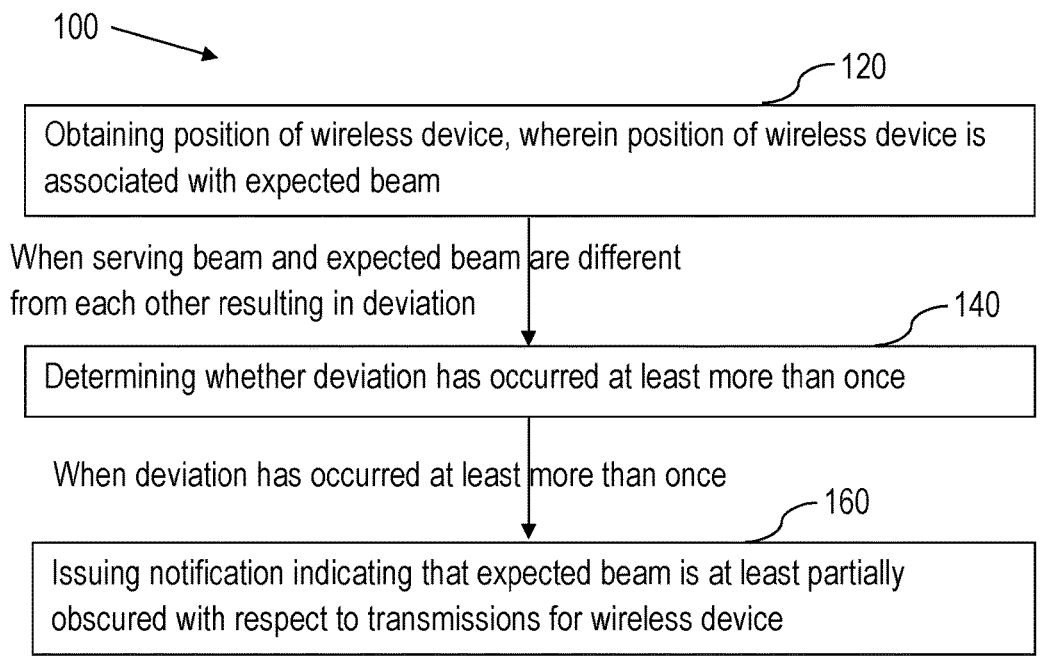
FIG. 1a is a flowchart of a method performed by a network node for communicating with a wireless device according to an exemplifying embodiment.

Embodiments herein relate to a method performed by a network node for communicating with a wireless device. The network node is operable in a wireless communication network, and the wireless device being associated with a serving beam managed by a radio network node associated with the network node. Embodiments of such a method will now be described with reference to FIGS. 1a-1d. FIG. 1a illustrates the method 100 comprising obtaining 120 a position of the wireless device, wherein the position of the wireless device is associated with an expected beam. When the serving beam and the expected beam are different from each other thereby resulting in a deviation, the method comprises determining 140 whether the deviation has occurred at least more than once. When the deviation has occurred at least more than once, the method comprises issuing 160 a notification indicating that the expected beam is at least partially obscured with respect to transmissions for the wireless device.

When the radio network node is serving the and/or communicating with the wireless device, the radio network node does so by using a beam that is directed towards the wireless device so that the coverage area of the beam covers the position of the wireless device. The wireless device is thus associated with an expected beam and/or a serving beam of the radio network node.

The network node may be an Operation and Maintenance, O&M, node; an Operation, Administration and Maintenance, OAM, node.

The radio network node may be a base station e.g. an evolved Node B, eNB, etc.

Figure 2A:
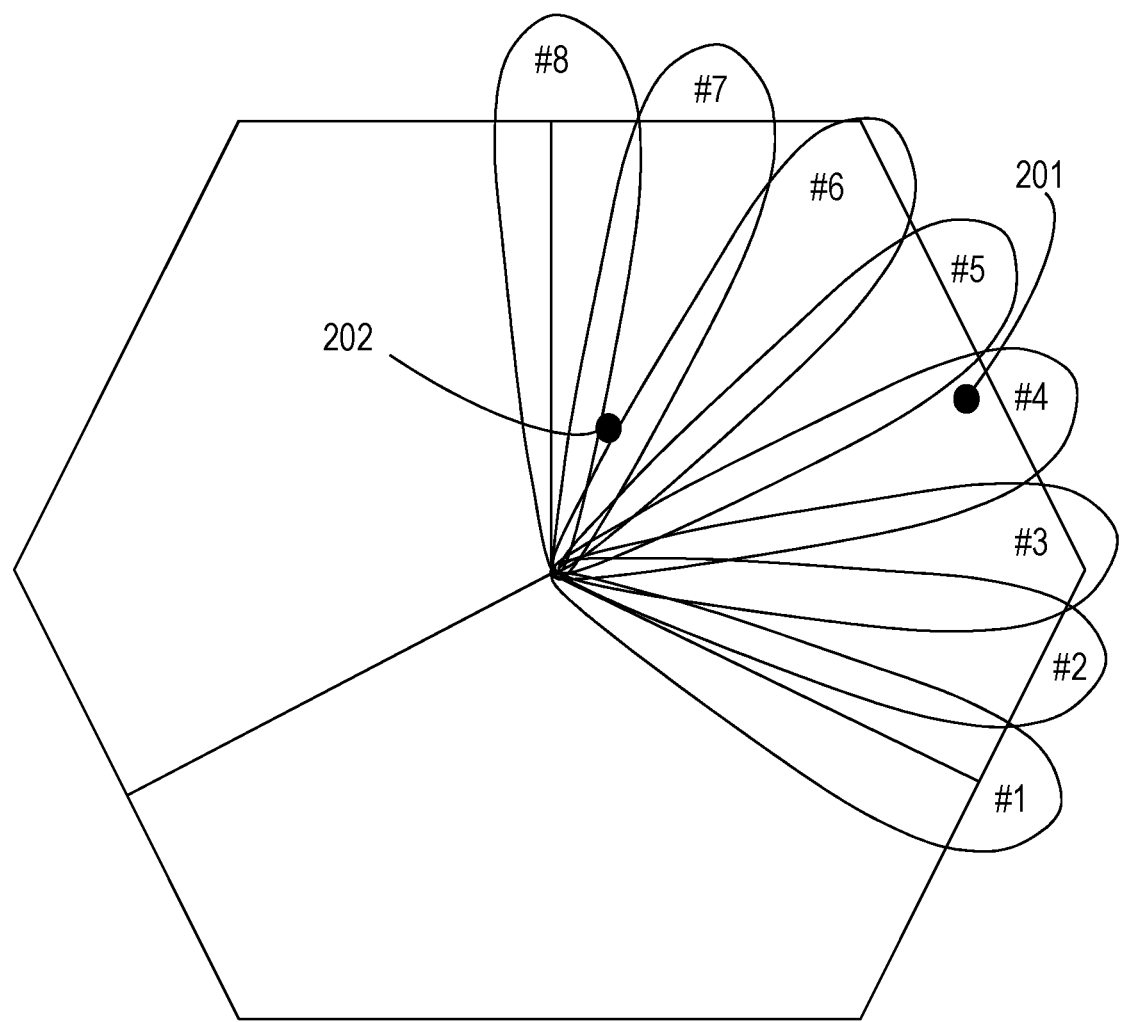
FIG. 2a is an illustration of a coverage area, or cell, of a network node, wherein different parts of the coverage area are covered or served by individual beams.

The radio network node may serve a geographical area by means of a plurality of different beams, see e.g. FIG. 2a in which only some beams are drawn covering a part of a total coverage area. In an example, the coverage area of the radio network node may be omnidirectional meaning that the radio network node may transmit and receive in 360 degrees, but that is not a requirement, just an example. A total coverage area of a radio network node is also referred to as a cell. A network node may be associated with more than one cell possibly covering at least partly the same area.

The radio network node may have a plurality of predefined beams each covering a part of the total coverage area of the radio network node. In this manner, different geographical positions within the total coverage area of the radio network node may be associated with individual beams, also referred to herein as expected beams. Again looking at FIG. 2a, only eight possible beams are illustrated and two wireless devices 201 and 202. For the position of wireless device 201, the expected beam is beam #4 but it may be possible to also serve the wireless device by beam #5, however with probably reduced signal quality and/or reduced throughput or bit rate. FIG. 2a also illustrates a wireless device 202 at a position for which the expected beam is beam #7, however also beams #6 and #8 may be used to serve the wireless device.

Reverting to FIG. 1a, the network node obtains 120 the position of the wireless device, wherein the position of the wireless device is associated with an expected beam. There are several ways for the network node to obtain the position of the wireless device, for example, the network node may request the wireless device to determine and report its position to the network node via the radio network node and/or the radio network node may determine the position of the wireless device. The network node may thus obtain the position of the wireless device by requesting the radio network node to determine and report the position of the wireless device. As described above, the position of the wireless device may be associated with an expected beam. It is pointed out that the granularity of different positions is such that the position of the wireless device may be associated with an expected beam.

The network node may then determine or deduce that the serving beam, i.e. the beam by means of which the network node is actually currently serving and/or communicating with the wireless device, is not the same as the expected beam. This means that there is a deviation in expected beam and serving beam. To exemplify in a non-limiting manner, assume in FIG. 2a that the wireless device 201 is currently being served by beam #5 and not the expected beam #4; such a situation results in a deviation in beams with regard to the position of the wireless device. The radio network node may report, to the network node, the serving beam by means of which the radio network node is serving the wireless device. In this manner, the network node is provided with information about (a) the position of the wireless device and may thus determine the expected beam, and (b) the serving beam, wherein the network node may determine if the expected beam and the serving beam are the same or different.

Reverting to FIG. 1a, when the serving beam and the expected beam are different from each other thereby resulting in a deviation, the method comprises determining 140 whether the deviation has occurred at least more than once. There may be several reasons for the deviation to occur, and just one occasion may be irrelevant. However, the same deviation may have occurred more than once, e.g. at so many occasions that the deviation may be statistically determined as a "constant" deviation for example during a period of time. The number of times in addition to a first time will be described in more detail below.

Once the network node has determined that the deviation with respect to the position of the wireless device, the method comprises issuing 160 a notification indicating that the expected beam is at least partially obscured with respect to transmissions for the wireless device.

The notification may for example be issued to (a) an operator of the wireless communication network in which the network node is comprised, (b) cell planning personnel, (c) a maintenance system such as a part (e.g. device) of the O&M system or OAM system. The notification may be a visual alarm e.g. a flashing light, an audible alarm, a text message or email to one or more recipients etc.

The notification informs the necessary system, department, or person(s) that the expected beam is at least partially obscured with respect to transmissions for the wireless device. Merely as some non-limiting and illustrative examples, there might be a relatively large garbage container, or a semi-permanent housing due to construction work, a permanent construction of some sort being placed at a position so that it at least partially obscures the expected beam with respect to transmissions to/from the wireless device, one or more trees may be covered in foliage, a billboard is erected etc. As exemplified above, the obstacle partially obscuring the expected beam may be temporary, semi-permanent or permanent depending on what the obstacle is. By issuing the alarm, the possible obstacle may be identified and measures can be taken in order for the wireless network to serve wireless devices in (or close to) the position in which the expected beam is at least partially obscured. By examining the reason for the issued alarm, it may also for example be determined that an antenna element of the radio network node is malfunctioning thereby distorting the expected beam. One exemplifying and non-limiting solution to still serve wireless devices in (or close to) the position in which the expected beam is at least partially obscured is to switch to the currently serving beam and indicate this serving beam to henceforth be the expected beam. Another exemplifying and non-limiting solution to still serve wireless devices in (or close to) the position in which the expected beam is at least partially obscured is to let another radio network node serve such wireless devices.

The method performed by the network node has several advantages. One possible advantage is that beams and/or cells where obstacles influence performance may be identified. Another possible advantage is that e.g. an operator may be provided with information to be used during network optimisation. Yet another possible advantage is that collected information may be used as input to automated coverage optimisation functionality.

Figure 1B:
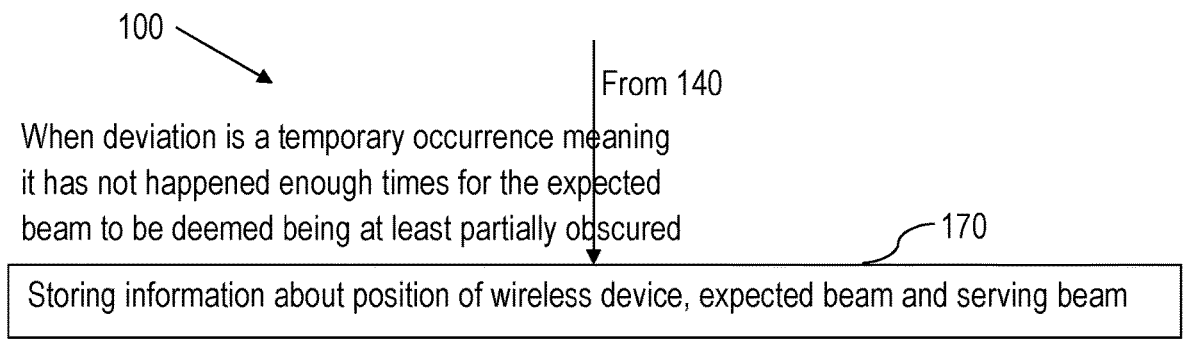
FIG. 1b is a flowchart of a method performed by a network node for communicating with a wireless device according to yet an exemplifying embodiment.

The method may further comprise, as illustrated in FIG. 1b, when the deviation is a temporary occurrence meaning it has not happened enough times for the expected beam to be deemed being at least partially obscured, storing 170 information about the position of the wireless device, the expected beam and the serving beam.

It might be that the deviation has occurred only once or only a few times so that it is difficult to determine that the deviation is not random. In such a case, the method comprises storing information about the position of the wireless device, the expected beam and the serving beam.

In this manner, the network node, operator, O&M, or OAM system may keep track of how many times certain wireless devices at positions within a cell or beam are not being served by the expected beam, and if so which is the serving beam. After the deviation has occurred, e.g. a predetermined number of times, it is statistically likely that the deviation is not random but occurs due to a reason, e.g. an obstacle of sort has been placed at a position so as to at least partially obscure the expected beam with respect to transmissions to/from the wireless device.

Figure 1C:
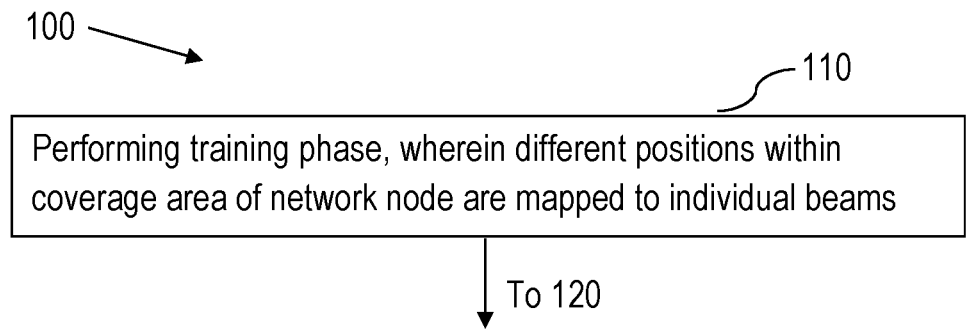
FIG. 1c is a flowchart of a method performed by a network node for communicating with a wireless device according to still an exemplifying embodiment.

The method may further comprise, as illustrated in FIG. 1c, performing 110 a training phase, wherein different positions within a coverage area of the radio network node are mapped to individual beams.

The training phase may comprise determining individual positions for wireless devices currently being served by, or connected to, the radio network node. The wireless devices are thus located at various geographical positions within the coverage area, or cell, of the radio network node. The radio network node may also determine which respective beam is used to serve respective wireless devices at their individual positions and report to the network node.

Once the radio network node has determined individual positions of the wireless devices and which respective beam is used for each individual wireless device and reported this to the network node, the network node may map the individual positions with respective beams.

Looking at FIG. 2a, in a very simplified and non-limiting example, the training phase for the scenario illustrated in FIG. 2a, the position of wireless device 201 is mapped to beam #4 as expected beam, and the position of wireless device 202 is mapped to beam #7 as expected beam. It is to be understood that there are likely many more than two wireless device present within the cell of the radio network node, wherein it is likely that each beam may be mapped to one or more individual geographical positions within the cell or coverage area of the radio network node. Further, the training phase may be following a previous training phase wherein the previous training phase and the current training phase may be compiled together since the two training phases may comprise different positions and the compilation of the two training phases may result in a more comprehensive mapping between various positions and expected beams. It is noted though that in case that a position in the latest training phase has been mapped to a different expected beam than any previous training phase, the latest training phase takes precedence and the mapping of the previous training phase with regard to position and expected beam is deleted or overwritten. It is also pointed out that the results of two or more training phases may alternatively not be compiled together, but instead results from any previous training phase is deleted and the only mapping between positions and beams used are those of the latest performed training phase.

In an example, the training phase is performed (a) at regular intervals, (b) upon a received command from an Operation, Administration and Maintenance, OAM, system, (c) after the issuing 160 of the notification, or (d) when a machine learning algorithm proposes performing the training phase.

As can be seen just above, the training phase may be performed according to one or more various schemes. For example, (a) at regular intervals. The regular intervals may be determined by e.g. an operator and may in a non-limiting example be daily. That means that the training phase may be performed daily. However, the training phase may be performed several times a day, every second or third day, weekly, monthly or at any regular time interval.

The training phase may alternatively be performed (b) upon a received command from an O&M, OAM system or any other management or maintenance system, node or centre. Merely as an illustrative and non-limiting example, after an update, re-configuration or other change to one or more radio network nodes of the wireless communication network associated with the network node, the mapping between individual positions and expected beam may need to be updated in view of the update, re-configuration or other change.

Alternatively, the network node may perform the training phase e.g. (c) after the issuing 160 of the notification. When the notification has been issued, the network node may perform the training phase since there is at least one position for which there is an established or determined deviation. The training phase will thus keep the mapping between the position and expected beam up to date.

Yet another alternative is to use machine learning for detection. The machine learning algorithm may be based on Artificial Intelligence, AI, for example. The machine learning algorithm may recognise different patterns in e.g. variations or changes is serving beam. If the machine learning algorithm detects that the expected beam and the geographical position of the wireless device do not match, meaning that expected beam and serving beam are different an alarm may be issued.

Figure 1D:
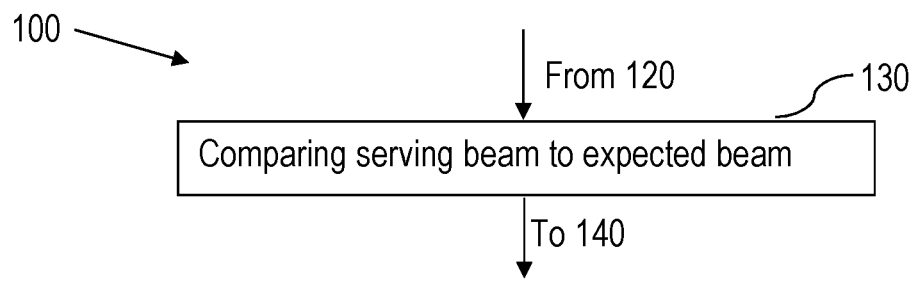
FIG. 1d is a flowchart of a method performed by a network node for communicating with a wireless device according to a further exemplifying embodiment.

The method may further comprise, as illustrated in FIG. 1d, comparing 130 the serving beam to the expected beam.

By comparing the serving beam to the expected beam, the network node may deduce or determine if they are one and the same or not. If they are not one and the same, there is a deviation between expecting beam and serving beam with respect to the position of the wireless device as explained above.

In case there is a deviation, the network node may take the necessary action(s) as described above, e.g. depending on whether the deviation is a random deviation or can be established to be a statistically determined deviation.

The determining 140 whether the deviation has occurred at least more than once may comprise applying statistical filtering and determining whether the result of the statistical filtering meets a predetermined threshold or not.

In order for the network node to not take any random deviation as a "permanent" or "true" deviation, the network node may apply statistical filtering. The statistical filtering enables the network node to determine, together with stored previously occurred deviations with respect to the same position, that the deviation is a permanent or true deviation. There may be temporary reasons for a random deviation, e.g. interference, radio resource usage etc. that may cause a temporary deviation. Such a deviation is not a permanent deviation, but rather due to temporary conditions that are likely to change rather quickly. However, the erection of a building, the planning of a tree, the placement of a relatively big container etc. are examples of "obstacles" that may cause the expected beam to be at least partially obscured for wireless devices in one or more positions within a cell of the radio network node.

By applying statistical filtering, the network node is enabled to determine whether, or when, the deviation is a "permanent" deviation. It is pointed out that "permanent" deviation does not mean that the obstacle causing the deviation has to be permanent, the obstacle may be a temporary hindrance or obstacle. By "permanent" deviation is intended "statistically probable" and not a random occasion.

The issuing 160 of the notification may comprise transmitting the indication to an Operation, Administration and Maintenance, OAM, system.

There are several examples of issuing the notification as described above. The recipient may be man or machine, e.g. OAM or O&M system, and the notification may be the transmitting of a text message or email, the sounding of an audible alarm, the flashing of light etc.

The obtaining of the position of the wireless device may comprise (a) transmitting a request to the wireless device to determine its position and receiving the position from the wireless device, (b) requesting the radio network node to perform measurements of the position of the wireless device, (c) requesting the radio network node to perform triangulation together with neighbouring radio network nodes, or (d) receiving position information of the wireless device from a Global Position System, GPS.

There are several ways for the network node to obtain the position of the wireless device. The network node may request the wireless device to determine its position itself. The wireless device may do this e.g. by measuring various pilot signals and/or reference signals from one or more network nodes.

The network node may itself request the radio network node to perform measurements of the position of the wireless device e.g. by measuring pilot signals and/or reference signals received from the wireless device.

A known way to determine the position of the wireless device is to perform triangulation together with neighbouring network nodes; and another way is to use GPS.

Embodiments will now be described with reference to FIGS. 2a-2c. FIG. 2a illustrates a cell or coverage area of a network node (not shown but at least an antenna arrangement of the network node is assumed to be at the centre of the hexagon). It is pointed out that an antenna arrangement of a network node does not have to be physically comprised in the network node, but instead geographically located at a distance from the network node. In the illustration, the cell of the network node is illustrated having three sectors and only beams of one of the sectors are illustrated for sake of simplicity. It is pointed out that the cell needs not be divided into sectors and this is mostly done in FIG. 2a for simplicity. The beams are a concept or solution where a sector (or cell) is covered by a set of beams so that radio resources may be shared by wireless devices in time and frequency without interference.

The assignment of beams to wireless devices is done based on the location of the wireless devices in the cell. In uplink this may be done by using pilot information. In downlink this could be done by wireless device feedback (closed loop mode) or done by the base station based on uplink beams (open loop mode). In free space propagation the direction of the beam pointing to the wireless device will be chosen. However, this may not be the case in non-free space radio environment and time dispersion.

Figure 2B:
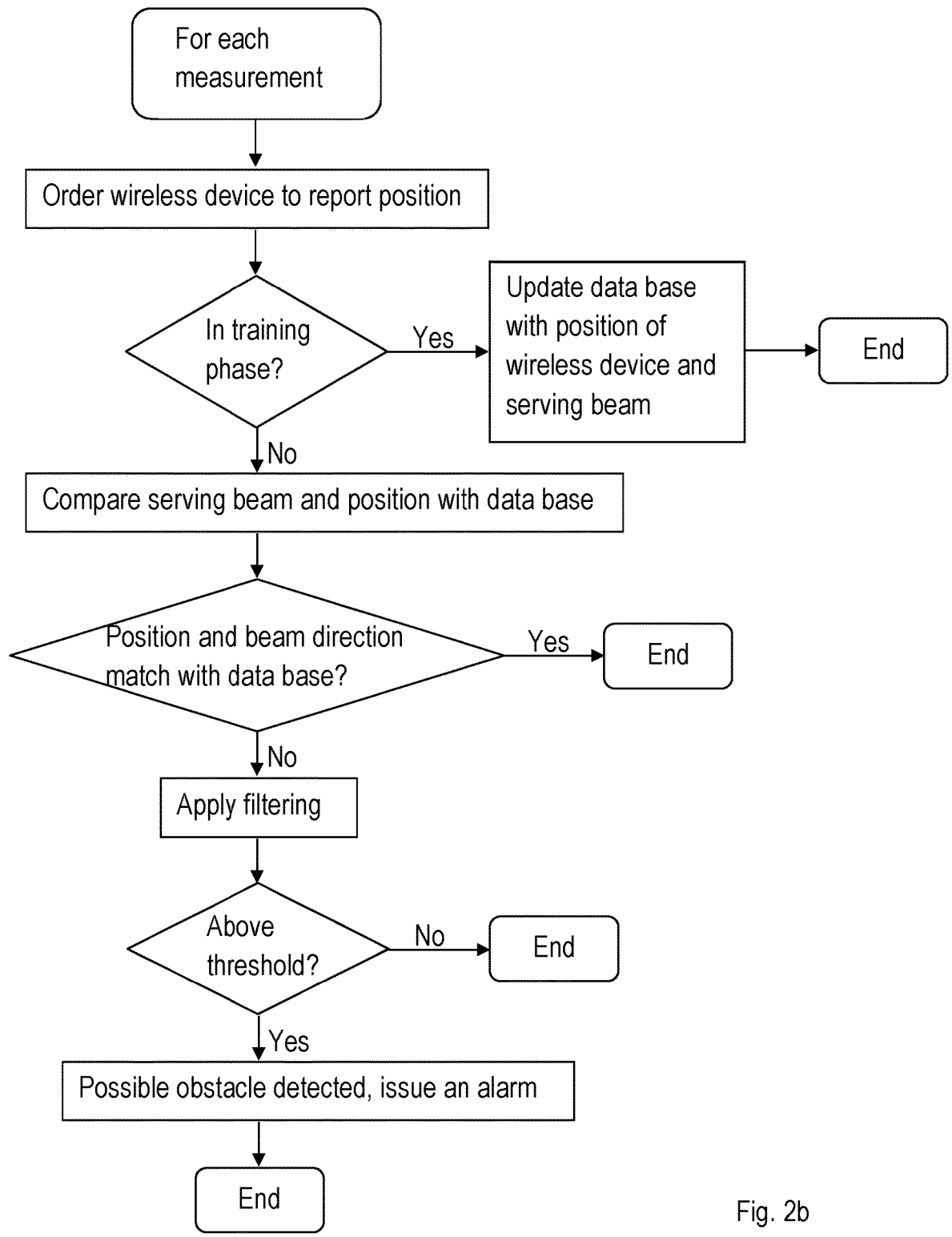
FIG. 2b is a flowchart of an example of a method for a network node to communicate with a wireless device.

In an example, illustrated in FIG. 2b, the network may trigger a wireless device reported position e.g. GPS measurement in wireless device. Wireless device positioning may be handled by a positioning system reporting to an O&M system. Base station system may in addition report beam information to the O&M system.

The O&M system may maintain a data base with a geographical grid into which the wireless device positions are mapped together with the beam direction for uplink and downlink. If the used beam direction for a given position is different from the beam direction in the data base it is assumed that this is due to an obstacle in that beam direction.

The network node may populate the O&M data base before the above detection can be done. This may be done e.g. during a training phase e.g. after commissioning or by a command from the operator as described above.

When the training phase is completed some statistical filtering may be needed before issuing a notification, e.g. an alarm e.g. the number of direction and position mismatches during a time interval needs to exceed a predefined threshold.

Since direction will probably vary due to radio environment there may be a need to do statistical filtering before issuing a notification.

Figure 2C:
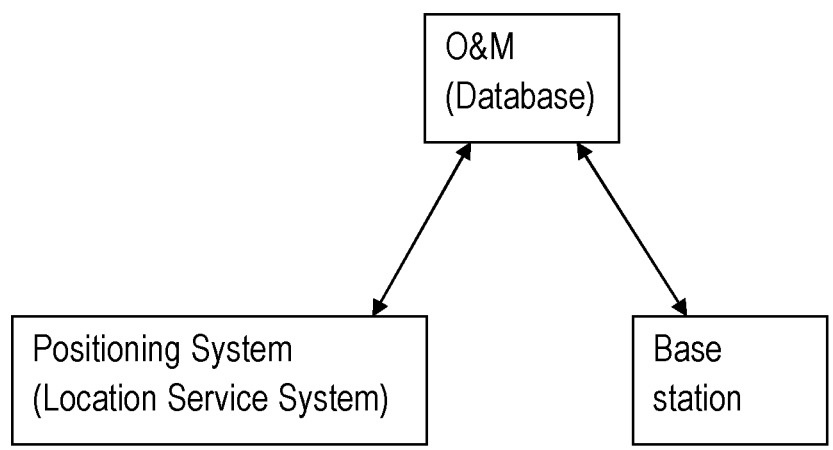
FIG. 2c is a block diagram illustrating an example of a relation between an Operation and Maintenance system comprising a data base, a positioning system and a base station.

FIG. 2c illustrates the relationship between e.g. an O&M comprising the data base of the mappings between positions and expected beams, the positioning system and the network node. It is pointed out that this is an illustrative example. The positioning system may instead be reporting to the network node, or be implemented in a distributed fashion in one or more nodes or subsystems, e.g. base station subsystem and O&M or OAM. In this illustrative example, the network node may be part of the O&M or the O&M may be comprised in the network node. Alternatively, the network node could be coupled to the O&M.

Embodiments herein also relate to a network node for communicating with a wireless device. The network node is operable in a wireless communication network, and the wireless device being associated with a serving beam managed by a radio network node associated with the network node. The network node has the same technical features, objects and advantages as the method performed by the network node described above. The network node will only be described in brief in order to avoid unnecessary repetition. Exemplifying embodiments of such a network node will now be described with reference to FIGS. 3 and 4.

Figure 3:
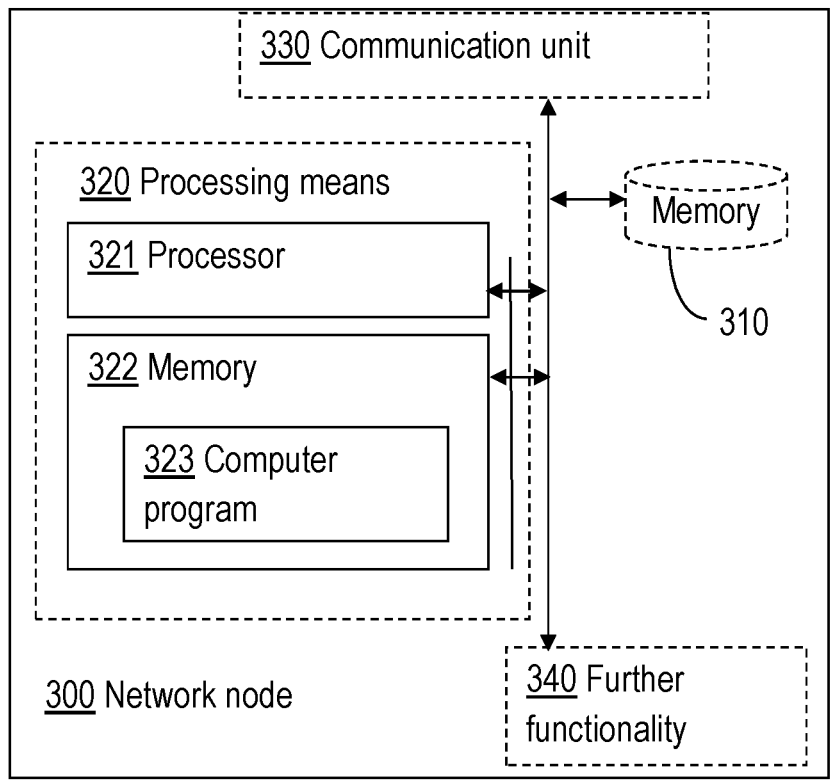
FIG. 3 is a block diagram of a network node for communicating with a wireless device according to an exemplifying embodiment.
Figure 4:
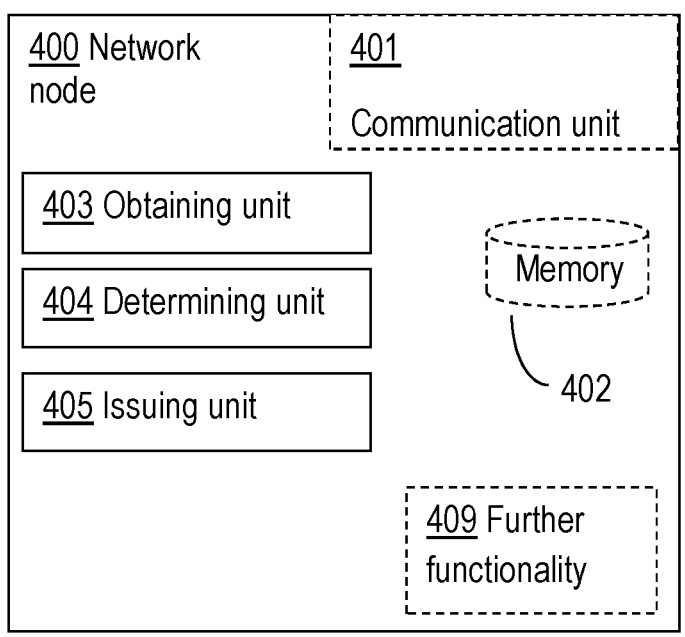
FIG. 4 is a block diagram of a network node for communicating with a wireless device according to another exemplifying embodiment.

FIGS. 3 and 4 illustrates the network node 300, 400 for communicating with a wireless device being configured for obtaining a position of the wireless device, wherein the position of the wireless device is associated with an expected beam. When the serving beam and the expected beam are different from each other thereby resulting in a deviation, the network node 300, 400 is configured for determining whether the deviation has occurred at least more than once. When the deviation has occurred at least more than once, the network node 300, 400 is configured for issuing a notification indicating that the expected beam is at least partially obscured with respect to transmissions for the wireless device.

The network node 300, 400 may be implemented or realised in different ways. An exemplifying implementation is illustrated in FIG. 3. FIG. 3 illustrates the network node 300 comprising a processor 321 and memory 322, the memory comprising instructions, e.g. by means of a computer program 423, which when executed by the processor 321 causes the network node 300 to obtain a position of the wireless device, wherein the position of the wireless device is associated with an expected beam. The memory 322 further comprises instructions, e.g. by means of a computer program 323, which when executed by the processor 321 causes the network node 300 to: (a) when the serving beam and the expected beam are different from each other thereby resulting in a deviation, determine whether the deviation has occurred at least more than once; and (b) when the deviation has occurred at least more than once, issue a notification indicating that the expected beam is at least partially obscured with respect to transmissions for the wireless device.

FIG. 3 also illustrates the network node 300 comprising a memory 310. It shall be pointed out that FIG. 3 is merely an exemplifying illustration and memory 310 may optionally, be a part of the memory 322 or be a further memory of the network node 300 operable in the wireless communication network. The memory may for example comprise information relating to the network node 300, to statistics of operation of the network node 300, just to give a couple of illustrating examples. FIG. 3 further illustrates the network node 300 comprising processing means 320, which comprises the memory 322 and the processor 321. Still further, FIG. 3 illustrates the network node 300 comprising a communication unit 330. The communication unit 330 may comprise an interface through which the network node 300 communicates with resources, arrangements or entities of the wireless communication network. FIG. 3 also illustrates the network node 300 comprising further functionality 340. The further functionality 340 may comprise hardware or software necessary for the network node 300 to perform different tasks that are not disclosed herein.

An alternative exemplifying implementation of the network node 300, 400 is illustrated in FIG. 4. FIG. 4 illustrates the network node 400 comprising an obtaining unit 403 for obtaining a position of the wireless device, wherein the position of the wireless device is associated with an expected beam. FIG. 4 also illustrates the network node 400 comprising a determining unit 404 for determining whether a deviation has occurred at least more than once when the serving beam and the expected beam are different from each other thereby resulting in the deviation. FIG. 4 also illustrates the network node 400 comprising an issuing unit 405 for issuing a notification indicating that the expected beam is at least partially obscured with respect to transmissions for the wireless device when the deviation has occurred at least more than once.

In FIG. 4, the network node 400 is also illustrated comprising a communication unit 401. Through this unit, the network node 400 is adapted to communicate with other arrangements and/or entities in the wireless communication network. The network node 400 may further comprise a non-volatile memory 402 for storing data. Further, the network node 400 may comprise a control or processing unit (not shown) which in turn is connected to the different units 403-405. It shall be pointed out that this is merely an illustrative example and the network node 400 may comprise more, less or other units or modules which execute the functions of the network node 400 in the same manner as the units illustrated in FIG. 4.

It should be noted that FIG. 4 merely illustrates various functional units in the network node 400 in a logical sense. The functions in practice may be implemented using any suitable software and hardware means/circuits etc. Thus, the embodiments are generally not limited to the shown structures of the network node 400 and the functional units. Hence, the previously described exemplary embodiments may be realised in many ways. For example, one embodiment includes a computer-readable medium having instructions stored thereon that are executable by the control or processing unit for executing the method steps in, or performed by, the network node 400. The instructions executable by the computing system and stored on the computer-readable medium perform the method steps of the network node 400 as set forth in the claims.

The network node has the same advantages as the method performed by the network node. One possible advantage is that beams and/or cells where obstacles influence performance may be identified. Another possible advantage is that e.g. an operator may be provided with information to be used during network optimisation. Yet another possible advantage is that collected information may be used as input to automated coverage optimisation functionality.

According to an embodiment, the network node 300, 400 is further configured for, when the deviation is a temporary occurrence meaning it has not happened enough times for the expected beam to be deemed being at least partially obscured, storing information about the position of the wireless device, the expected beam and the serving beam.

According to yet an embodiment, the network node 300, 400 is further configured for performing a training phase, wherein different positions within a coverage area of the radio network node are mapped to individual beams.

According to still an embodiment, the network node 300, 400 is further configured for performing the training phase (a) at regular intervals, (b) upon a received command from an Operation, Administration and Maintenance, OAM, system, (c) after the issuing (160) of the notification, or (d) when a machine learning algorithm proposes performing the training phase.

According to a further embodiment, the network node 300, 400 is further configured for comparing the serving beam to the expected beam.

According to another embodiment, the network node 300, 400 is further configured for determining whether the deviation has occurred at least more than once by applying statistical filtering and determining whether the result of the statistical filtering meets a predetermined threshold or not.

According to an embodiment, the issuing of the notification comprises transmitting the indication to OAM system.

According to yet an embodiment, the obtaining of the position of the wireless device comprises (a) transmitting a request to the wireless device to determine its position and receiving the position from the wireless device, (b) requesting the radio network node to perform measurements of the position of the wireless device, (c) requesting the radio network node to perform triangulation together with neighbouring radio network nodes, or (d) receiving position information of the wireless device from a Global Position System, GPS.

Figure 5:
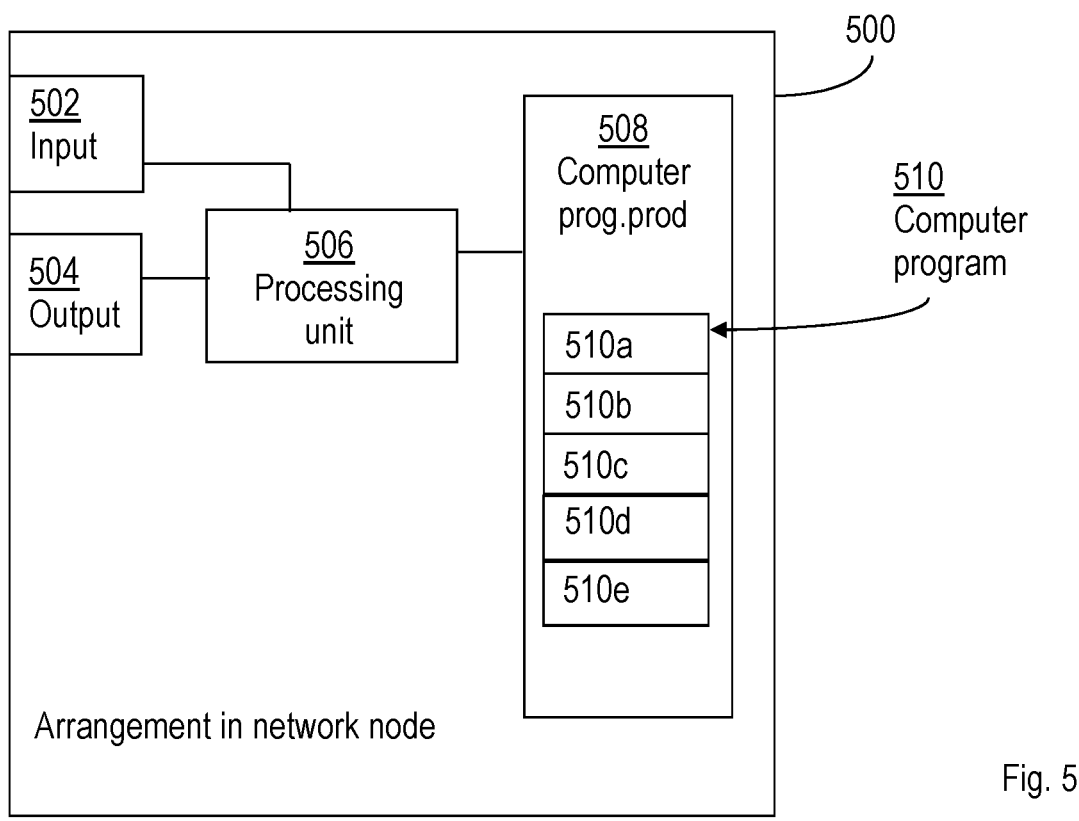
FIG. 5 is a block diagram of an arrangement in a network node for communicating with a wireless device according to an exemplifying embodiment.

FIG. 5 schematically shows an embodiment of an arrangement 500 in a network node 400 operable in a wireless communication network. Comprised in the arrangement 500 in the network node 400 are here a processing unit 506, e.g. with a DSP. The processing unit 506 may be a single unit or a plurality of units to perform different actions of procedures described herein. The arrangement 500 in the network node 400 may also comprise an input unit 502 for receiving signals from other entities, devices or arrangements, and an output unit 504 for providing signal(s) to other entities, devices or arrangements. The input unit and the output unit may be arranged as an integrated entity or as illustrated in the example of FIG. 4, as one or more interfaces 401.

Furthermore, the arrangement 500 in the network node 400 comprises at least one computer program product 508 in the form of a non-volatile memory, e.g. an EEPROM, a flash memory and a hard drive. The computer program product 508 comprises a computer program 510, which comprises code means, which when executed in the processing unit 506 in the arrangement 500 in the network node 400 causes the network node 400 to perform the actions e.g. of the procedure described earlier in conjunction with FIGS. 1a-1d.

The computer program 510 may be configured as a computer program code structured in computer program modules 510a-510e. Hence, in an exemplifying embodiment, the code means in the computer program of the arrangement 500 in the network node 400 comprises an obtaining unit, or module, for obtaining a position of the wireless device, wherein the position of the wireless device is associated with an expected beam; and a determining unit, or module, for determining whether a deviation has occurred at least more than once when the serving beam and the expected beam are different from each other thereby resulting in the deviation. The computer program further comprises an issuing unit, or module, for issuing a notification indicating that the expected beam is at least partially obscured with respect to transmissions for the wireless device when the deviation has occurred at least more than once.

The computer program modules could essentially perform the actions of the flow illustrated in FIGS. 1a-1d, to emulate the network node 400 operable in the wireless communication network. In other words, when the different computer program modules are executed in the processing unit 506, they may correspond to the units 403-405 of FIG. 4.

Although the code means in the respective embodiments disclosed above in conjunction with FIG. 4 is implemented as computer program modules which when executed in the processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node for communicating with a wireless device, the network node being operable in a wireless communication network, the wireless device being associated with a serving beam managed by a radio network node associated with the network node, the method comprising:
   obtaining a position of the wireless device, wherein the position of the wireless device is associated with an expected beam,
   when the serving beam and the expected beam are different from each other thereby resulting in a deviation:
   determining whether the deviation has occurred at least more than once, when the deviation has occurred at least more than once:
   issuing a notification indicating that the expected beam is at least partially obscured with respect to transmissions for the wireless device; and
   determining whether the deviation is a temporary occurrence meaning it has not happened enough times for the expected beam to be deemed being at least partially obscured.

2. The method according to claim 1, further comprising when the deviation is a temporary occurrence, storing information about the position of the wireless device, the expected beam and the serving beam.

3. The method according to claim 1, further comprising performing a training phase, wherein different positions within a coverage area of the radio network node are mapped to individual beams.

4. The method according to claim 3, wherein the training phase is performed (a) at regular intervals, (b) upon a received command from an Operation, Administration and Maintenance, OAM, system, (c) after the issuing of the notification, or (d) when a machine learning algorithm proposes performing the training phase.

5. The method according to claim 1, further comprising comparing the serving beam to the expected beam.

6. The method according to claim 1, wherein the determining whether the deviation has occurred at least more than once comprises applying statistical filtering and determining whether the result of the statistical filtering meets a predetermined threshold or not.

7. The method according to claim 1, wherein the issuing of the notification comprises transmitting the indication to an Operation, Administration and Maintenance, OAM, system.

8. The method according to claim 1, wherein the obtaining of the position of the wireless device comprises (a) transmitting a request to the wireless device to determine its position and receiving the position from the wireless device, (b) requesting the radio network node to perform measurements of the position of the wireless device, (c) requesting the radio network node to perform triangulation together with neighbouring radio network nodes, or (d) receiving position information of the wireless device from a Global Position System, GPS.

9. A network node for communicating with a wireless device, the network node being operable in a wireless communication network, the wireless device being associated with a serving beam managed by a radio network node associated with the network node, the network node being configured for:
obtaining a position of the wireless device, wherein the position of the wireless device is associated with an expected beam,
when the serving beam and the expected beam are different from each other—thereby resulting in a deviation:
determining whether the deviation has occurred at least more than once, when the deviation has occurred at least more than once:
issuing a notification indicating that the expected beam is at least partially obscured with respect to transmissions for the wireless device; and
determining whether the deviation is a temporary occurrence meaning it has not happened enough times for the expected beam to be deemed being at least partially obscured.

10. The network node according to claim 9, further being configured for, when the deviation is a temporary occurrence, storing information about the position of the wireless device, the expected beam and the serving beam.

11. The network node according to claim 9, further being configured for performing a training phase, wherein different positions within a coverage area of the radio network node are mapped to individual beams.

12. The network node according to claim 11, wherein the network node is configured for performing the training phase (a) at regular intervals, (b) upon a received command from an Operation, Administration and Maintenance, OAM, system, (c) after the issuing of the notification, or (d) when a machine learning algorithm proposes performing the training phase.

13. The network node according to claim 9, further being configured for comparing the serving beam to the expected beam.

14. The network node according to claim 9, wherein the network node is configured for determining whether the deviation has occurred at least more than once by applying statistical filtering and determining whether the result of the statistical filtering meets a predetermined threshold or not.

15. The network node according to claim 9, wherein the issuing of the notification comprises transmitting the indication to an Operation, Administration and Maintenance, OAM, system.

16. The network node according to claim 9, wherein the obtaining of the position of the wireless device comprises (a) transmitting a request to the wireless device to determine its position and receiving the position from the wireless device, (b) requesting the radio network node to perform measurements of the position of the wireless device, (c) requesting the radio network node to perform triangulation together with neighbouring radio network nodes, or (d) receiving position information of the wireless device from a Global Position System, GPS.

* * * * *